(12) United States Patent
Singh

(10) Patent No.: US 10,885,183 B2
(45) Date of Patent: *Jan. 5, 2021

(54) RETURN ORIENTED PROGRAMMING ATTACK PROTECTION

(71) Applicant: International Business Machines Corporation, Armonk, NY (US)

(72) Inventor: Balbir Singh, Canberra (AU)

(73) Assignee: International Business Machines Corporation, Armonk, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 15/718,436

(22) Filed: Sep. 28, 2017

(65) Prior Publication Data

US 2019/0095612 A1    Mar. 28, 2019

(51) Int. Cl.
*G06F 21/00* (2013.01)
*G06F 21/52* (2013.01)
*G06F 21/56* (2013.01)

(52) U.S. Cl.
CPC .............. *G06F 21/52* (2013.01); *G06F 21/56* (2013.01); *G06F 2221/033* (2013.01)

(58) Field of Classification Search
CPC ..... G06F 21/52; G06F 21/56; G06F 2221/033
See application file for complete search history.

(56) References Cited

U.S. PATENT DOCUMENTS

| | | | |
|---|---|---|---|
| 2014/0075556 A1 | 3/2014 | Wicherski | |
| 2014/0283040 A1* | 9/2014 | Wilkerson | G06F 21/52 726/22 |
| 2014/0283076 A1* | 9/2014 | Muttik | G06F 21/554 726/24 |
| 2015/0095628 A1 | 4/2015 | Yamada | |
| 2015/0215335 A1* | 7/2015 | Giuliani | G06F 21/554 726/23 |
| 2015/0356294 A1* | 12/2015 | Tan | G06F 21/54 726/22 |
| 2016/0012229 A1 | 1/2016 | Fischer | |

(Continued)

OTHER PUBLICATIONS

Pfaff et al., "Learning How to Prevent Return-Oriented Programming Efficiently", F. Piessens et al. (Eds.): ESSoS 2015, LNCS 8978, 2015, © Springer International Publishing Switzerland 2015, 2 pages.

(Continued)

*Primary Examiner* — John B King
(74) *Attorney, Agent, or Firm* — Stephen R. Yoder

(57) ABSTRACT

A computer implemented method for preventing return-oriented programming (ROP) attacks includes registering one or more critical regions, wherein a critical region corresponds to an address that has been selected to be monitored for potential ROP attacks, identifying one or more critical functions, wherein a critical function corresponds to a function that has been selected to be analyzed as a potential ROP threat, instrumenting the one or more critical regions with ROP protection mechanisms, detecting a critical function execution attempt on one or more of the identified critical regions, determining whether values associated with the critical function match corresponding expected values, and, responsive to determining that values associated with the critical function do not match expected values, activating a return-oriented programming protection mechanism.

13 Claims, 4 Drawing Sheets

(56) References Cited

U.S. PATENT DOCUMENTS

| | | | |
|---|---|---|---|
| 2016/0021134 A1* | 1/2016 | Li | G06F 21/52 |
| | | | 726/23 |
| 2016/0034687 A1 | 2/2016 | Rhee et al. | |
| 2016/0077834 A1* | 3/2016 | de Perthuis | G06F 9/3806 |
| | | | 712/201 |
| 2016/0085966 A1 | 3/2016 | Fischer et al. | |
| 2016/0092673 A1 | 3/2016 | LeMay et al. | |
| 2016/0283714 A1 | 9/2016 | LeMay et al. | |
| 2016/0381050 A1* | 12/2016 | Shanbhogue | G06F 12/1027 |
| | | | 726/23 |
| 2017/0091454 A1* | 3/2017 | Sukhomlinov | G06F 21/566 |
| 2017/0228535 A1* | 8/2017 | Shanbhogue | G06F 3/0673 |
| 2018/0060568 A1* | 3/2018 | Galenson | G06F 21/52 |
| 2019/0258806 A1* | 8/2019 | Levin | G06F 21/44 |

OTHER PUBLICATIONS

Tymburiba et al., "Inference of Peak Density of Indirect Branches to Detect ROP Attacks", CGO'16, Mar. 12-18, 2016, Barcelona, Spain, © 2016 ACM, 978-1-4503-3778-6/16/03, http://dx.doi.org/10.1145/2854038.2854049, 10 pages.

IBM, Appendix P, list of patents or patent application treated as related, filed herewith, Dec. 7, 2017, 2 pages.

Singh, Balbir, "Return Oriented Programming Attack Protection", U.S. Appl. No. 15/834,277, filed Dec. 7, 2017, 22 pages.

* cited by examiner

RETURN ORIENTED PROGRAMMING ATTACK PROTECTION

BACKGROUND OF THE INVENTION

The present invention relates generally to the field of computer security, and more specifically to preventing return-oriented programming attacks.

Return-oriented programming (ROP) is a technique for exploiting computer security wherein an attacker is able to execute code even in the presence of security defenses, such as code signing and non-executable memory. In such an attack, the attacker manipulates a call stack to control a program's control flow, and then executes specific machine instruction sequences that already exist in the machine's memory, called gadgets. Typically, a gadget located in a subroutine within either the existing program or within a shared library code. Gadgets also typically end in a return instruction.

SUMMARY

As disclosed herein, a computer implemented method for preventing return-oriented programming (ROP) attacks includes registering one or more critical regions, wherein a critical region corresponds to an address that has been selected to be monitored for potential ROP attacks, identifying one or more critical functions, wherein a critical function corresponds to a function that has been selected to be analyzed as a potential ROP threat, instrumenting the one or more critical regions with ROP protection mechanisms, detecting a critical function execution attempt on one or more of the identified critical regions, determining whether values associated with the critical function match corresponding expected values, and, responsive to determining that values associated with the critical function do not match expected values, activating a return-oriented programming protection mechanism. A computer program product and computer system corresponding to the method are also disclosed.

DETAILED DESCRIPTION

Return Oriented Programming (ROP) is gaining attention in the security industry due to the lack of a reliable way to handle ROP attacks. Some implementations provide hardware support to detect potential ROP attacks by building heuristics into hardware that can identify ROP attack patterns and either report them or block them. These solutions, however, often lead to significant overhead required to process events associated with potential ROP attacks. The present invention as disclosed minimizes the amount of hardware required to detect potential ROP attacks.

The present invention will now be described in detail with reference to the Figures. Implementation of embodiments of the invention may take a variety of forms, and exemplary implementation details are discussed subsequently with reference to the Figures.

Figure 1:
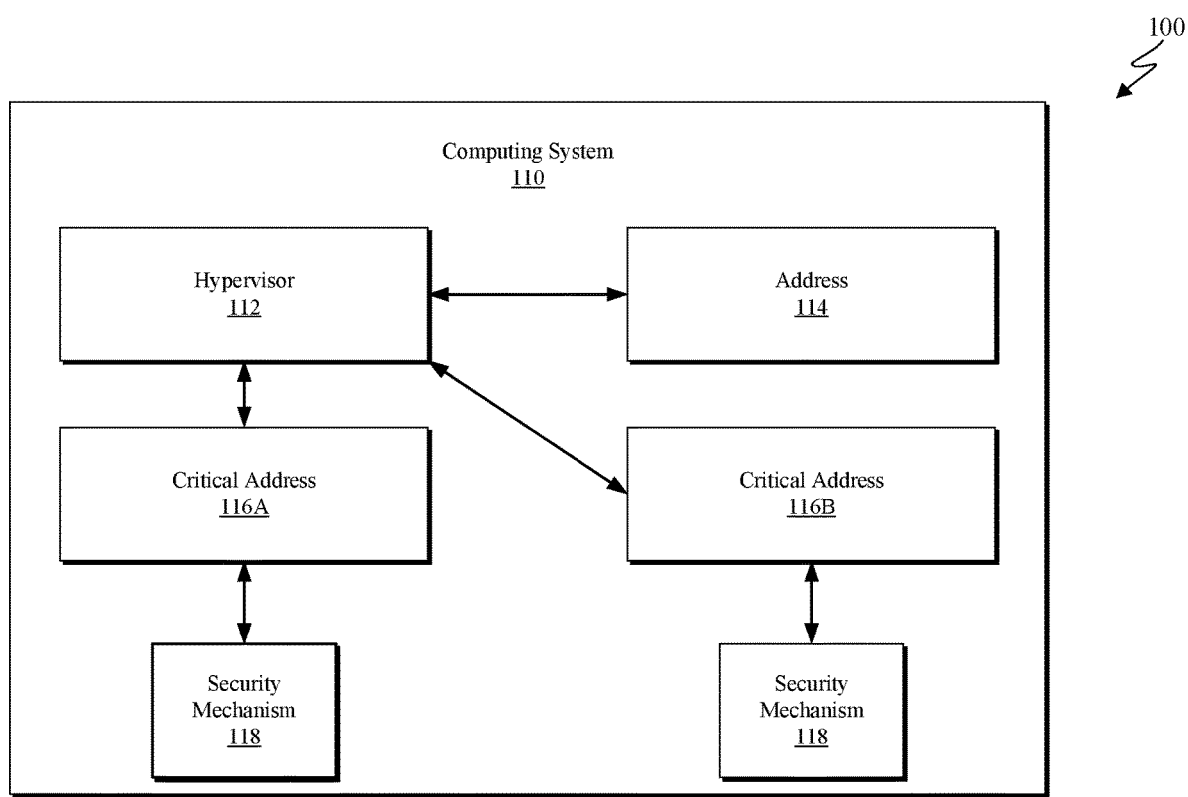
FIG. 1 is a functional block diagram depicting a ROP detection system in accordance with one embodiment of the present invention.

FIG. 1 is a functional block diagram depicting a ROP detection system 100 in accordance with one embodiment of the present invention. The depicted embodiment of ROP detection system 100 corresponds to a computing system 110, but it should be noted that in additional embodiments, an ROP detection system may include multiple computing systems and one or more networks across which said multiple computing systems may communicate.

Computing system 110 can be a desktop computer, laptop computer, specialized computer server, or any other computer system known in the art. In some embodiments, computing system 110 represents a computer system utilizing clustered computers and components to act as a single pool of seamless resources. In general, computing system 110 is representative of any electronic device, or combinations of electronic devices, capable of executing machine-readable program instructions, as described in greater detail with regard to FIG. 4.

Hypervisor (or virtual machine monitor) 112 may be software, firmware, or hardware configured to create and run virtual machines. Hypervisor 112 may be configured to provide guest operating systems with a virtual operating platform and manage the execution of said guest operating systems. In the depicted embodiment, hypervisor 112 is configured to manage the execution and operation of address 114 and critical addresses 116. Additionally, hypervisor 112 may be configured to communicate with security mechanisms 118, either to receive security information or to provide security instructions to the security mechanisms 118.

Address 114 and critical addresses 116 may correspond to separate virtual machine instances created or managed by hypervisor 112. The depicted embodiment includes two critical addresses 116 and a single additional address 114, but it should be appreciated that in other embodiments of the present invention, any number of addresses and critical addresses may be present within an ROP detection system. Address 114 may also be referred to as a non-critical address, as it is simply an address that has not been identified as a critical region with respect to potential ROP attacks. In one embodiment, critical addresses 116 are regions that are registered by the hypervisor 112 as "special" or critical. The critical regions correspond to address which a branch, jump, or return to may indicate a potential ROP attack.

Security mechanisms 118 may correspond to any known ROP protection mechanism in the art. In one embodiment, security mechanisms 118 correspond to shadow stack mechanisms. A shadow stack maintains control-flow integrity by mitigating return address overwrites such as those seen during exploitation of a stack buffer overflow. Shadow stacks first keep a record of legitimate return addresses for one or more function calls, and then check that a return address associated with a call is still correct before return. In other embodiments, security mechanisms 118 correspond to one or more nested protection mechanisms acting together or separately to detect or prevent ROP attacks.

Figure 2:
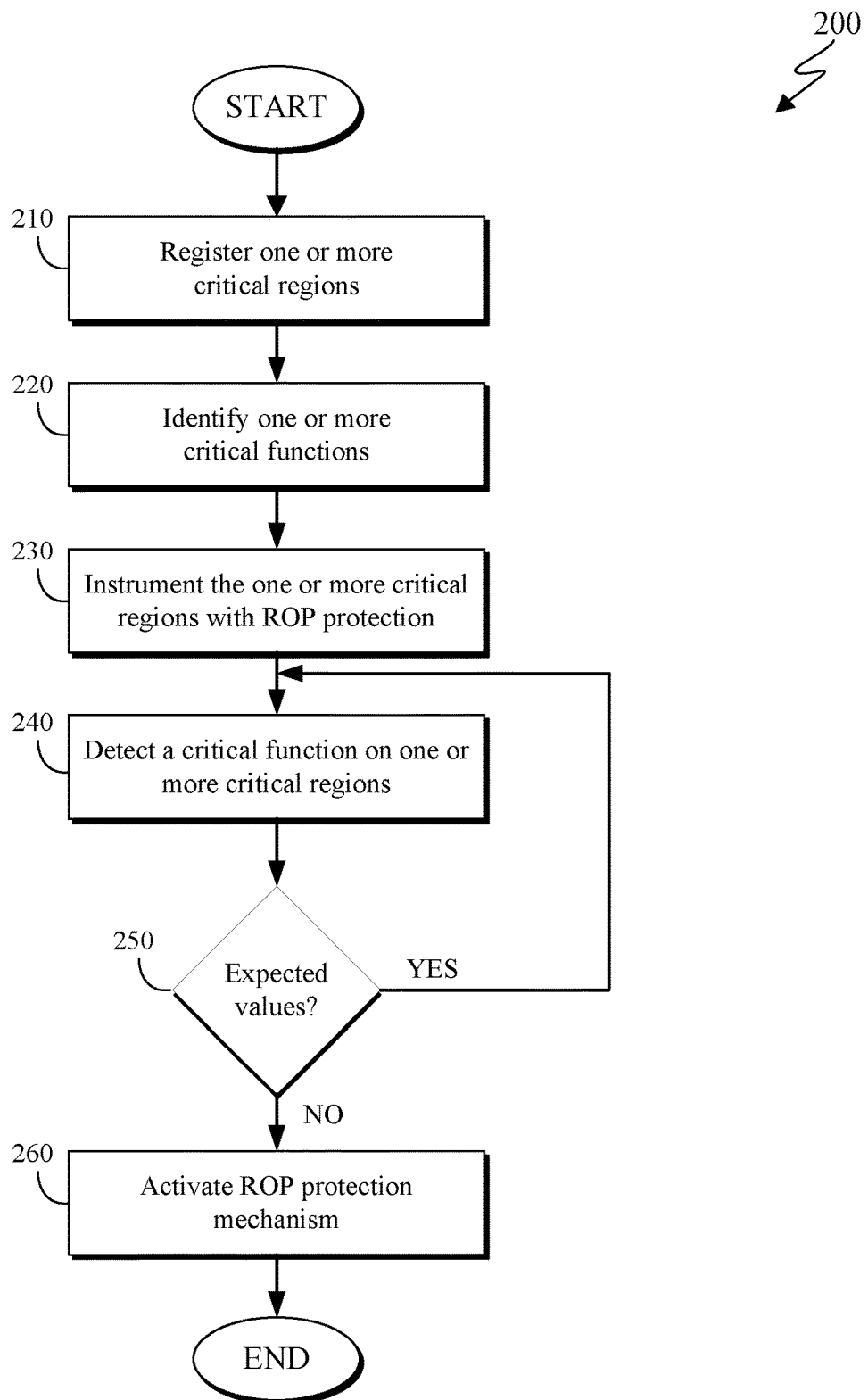
FIG. 2 is a flowchart depicting a ROP protection method in accordance with one embodiment of the present invention.

FIG. 2 is a flowchart depicting a ROP protection method 200 in accordance with one embodiment of the present invention. As depicted, ROP attack detection method 200 includes registering (210) one or more critical regions, identifying (220) one or more critical functions, instrumenting (230) the one or more critical regions with ROP protection mechanisms, detecting (240) a critical function execution attempt on one or more of the identified critical regions, determining (250) whether values associated with the critical function match expected values, and activating (260) a return-oriented programming protection mechanism. ROP protection method 200 provides protection from ROP attacks with minimal hardware requirements.

Registering (210) one or more critical regions may include a hypervisor or OS identifying one or more addresses (or special addresses). In at least one embodiment, registering (210) one or more critical regions includes a security domain expert identifying one or more gadgets that are commonly used in ROP attacks. In an example where a protection function is used to change permissions in an OS, the special address would consist of the text region containing said protection function.

Identifying (220) one or more critical functions may include identifying a set of one or more critical functions which correspond to potential ROP attacks. With respect to ROP attacks, each attack typically centers around executing machine instruction sequences (or gadgets) that exist in the corresponding program. These machine instruction sequences typically end in a return instruction. Therefore, in at least some embodiments, the one or more identified critical functions may include at least any functions or machine instruction sequences which end in a return instruction. In other embodiments, a function or machine instruction sequence ending in a return instruction may be deemed critical only if the return instruction corresponds to an identified critical region. The critical functions may additionally include branch operations or jump operations, particularly if said branch or jump operations correspond to an identified critical region. In some embodiments, critical functions may additionally refer to any functions that impact system behavior. For example, "mprotect" on Linux™ changes execution protection, and may therefore be identified as a critical function.

Instrumenting (230) the one or more critical regions with ROP protection mechanisms may include implementing one or more protection mechanisms with respect to the identified one or more critical regions. For example, once the one or more critical regions are identified, a shadow stack may be employed to monitor the one or more identified critical regions. A shadow stack is a mechanism for maintaining control-flow integrity by mitigating return address overwrites. Shadow stacks make a record of legitimate return addresses for one or more function calls, and then check that a return address is correct with respect to an attempted function call before returning. With respect to some embodiments of the present invention, the implemented shadow stacks keep a record of legitimate return addresses for each identified critical function. In additional embodiments, instrumenting (230) the one or more critical regions may include implementing one or more nested protection mechanisms configured to prevent ROP attacks.

Detecting (240) critical function on one or more of the identified critical regions may include monitoring functions executed with respect to the identified critical regions. In at least one embodiment of the present invention, detecting (240) a call or return on one or more of the identified critical regions may include implementing a shadow stack to monitor and analyze call functions with respect to an identified critical region. The implemented shadow stack may analyze only calls or returns that have been identified as critical functions. In other embodiments, the shadow stack may monitor and analyze each incoming function call, and only continues to comparing call or return values to an expected result if an incoming function call corresponds to a critical function. Once a critical function is detected, the method continues by determining (250) whether values associated with the critical function match expected values.

Determining (250) whether values associated with the detected critical function match expected values may include comparing one or more values corresponding to the critical function to one or more corresponding expected values. The compared values may be addresses to which the detected critical function corresponds. For example, if the detected critical function includes a return operation, an associated value may be the address to which the function is attempting to return. If the critical function values match the one or more expected values, the method returns to detecting (240) a critical function on one or more critical regions. If the critical function values do not match the one or more expected values, the method continues by activating (260) an ROP attack protection mechanism.

Activating (260) a return-oriented programming protection mechanism may include blocking the attempted critical function from executing. In some embodiments, activating (260) a return-oriented programming protection mechanism further includes reporting the attempted critical function execution. Such a report may include the details of the critical function, including what kind of function it was, what address or addresses it corresponded to, a timestamp, or any other pertinent execution information.

Figure 3:
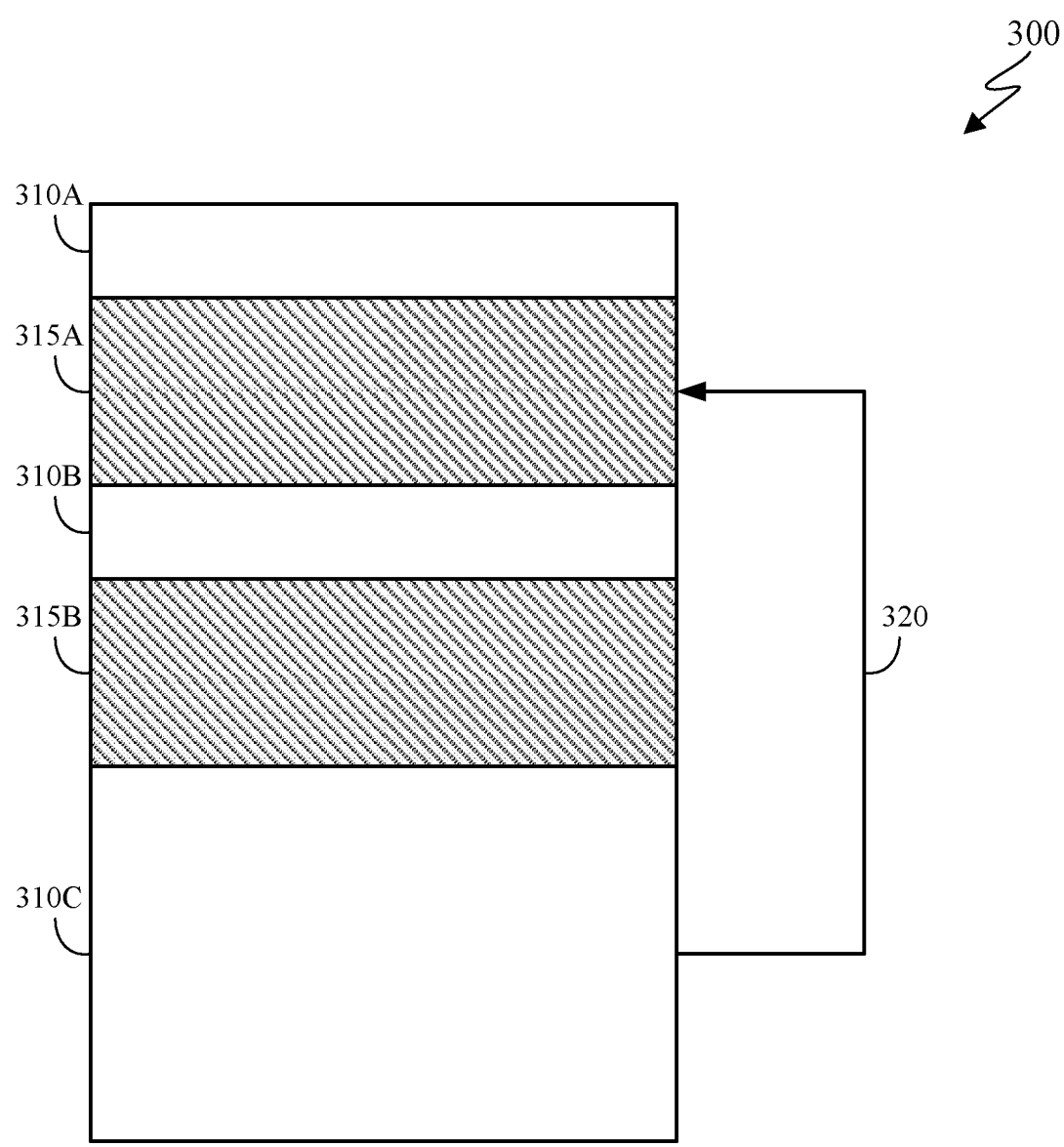
FIG. 3 is a diagram depicting a sample address space in accordance with one embodiment of the present invention.

FIG. 3 is a diagram depicting a sample address space 300 in accordance with one embodiment of the present invention. As depicted, sample address space includes addresses 310, critical regions 315, and a call 320. The addresses 310 are depicted as white areas in the sample address space 300, and the critical regions 315 are depicted as slashed areas in the sample address space 300. Sample address space 300 may correspond to an address space that is managed using an ROP protection method, such as ROP protection method 200.

With respect to the depicted embodiment, critical regions 315 correspond to addresses with respect to which a return will trigger an ROP protection mechanism. For example, call 320 originates in address 320C, which is not a critical region, but call 320 returns to critical region 315A. As a result, in the depicted embodiment, call 320 would be flagged for analysis, and the values associated with call 320 (such as the return address) would be compared to a set of expected values. This analysis might be executed by a shadow stack or any other hardware/software mechanism available for ROP attack detection. If these values match, or rather, if it is expected that call 320 would return to critical region 315A, then the call is executed as intended. If these values do not match, and the call's return value is expected to be something other than critical region 315A, then the call is blocked, and may be flagged as a potential ROP attack. For example, a processor fault or exception might be raised for privileged modes to analyze. Additionally, once a call or function has been identified as a potential ROP attack, it may be added to a log of potentially malicious calls or functions.

Figure 4:
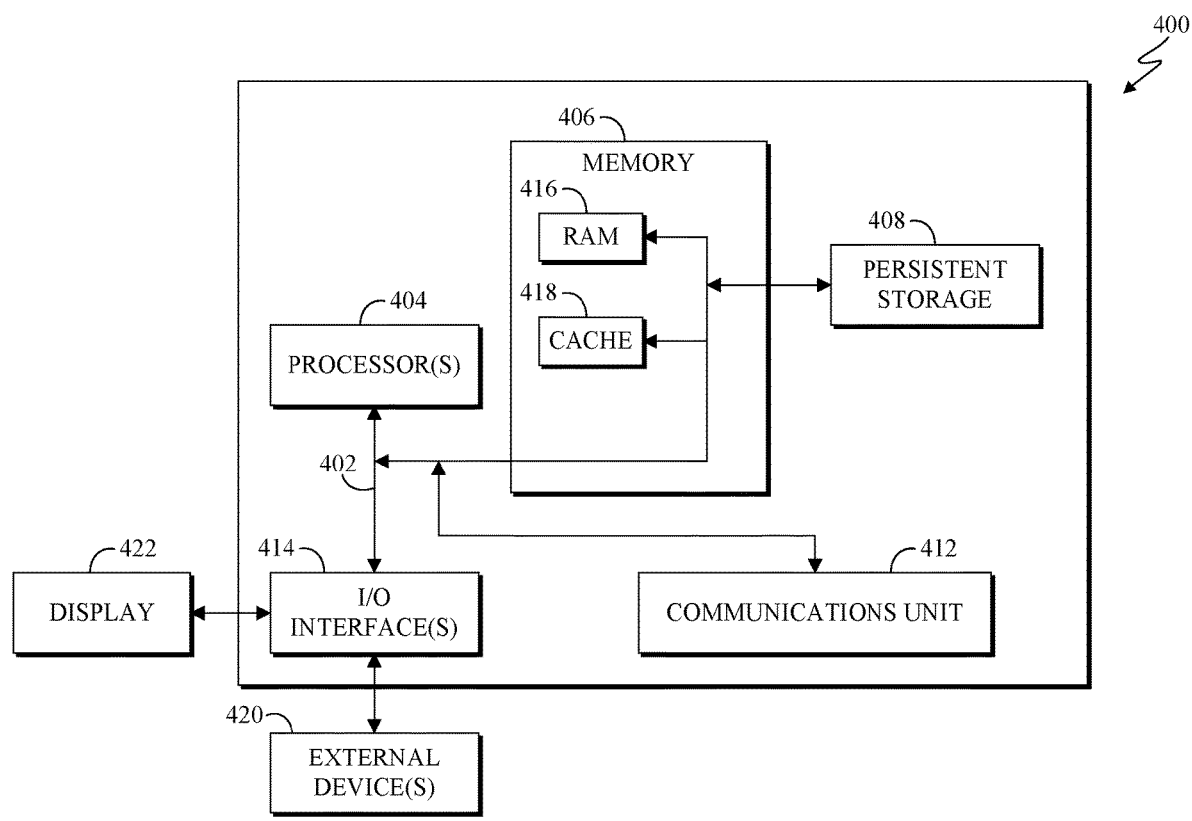
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for preventing return-oriented programming (ROP) attacks, the computer program product comprising:
   one or more computer readable storage media and program instructions stored on the one or more computer readable storage media, the program instructions comprising instructions to:
   analyze one or more addresses to identify one or more critical regions, wherein a critical region corresponds to an address that has been selected to be monitored for potential ROP attacks;
   responsive to identifying one or more critical regions, register the one or more critical regions;
   identify one or more critical functions, wherein a critical function corresponds to a function for which corresponding execution attempts will be selected to be analyzed as a potential ROP threat;
   instrument the one or more critical regions with ROP protection mechanisms;
   detect a critical function execution attempt on one or more of the identified critical regions;
   determine whether values associated with the critical function match corresponding expected values; and
   responsive to determining that values associated with the critical function do not match expected values, activate a return-oriented programming protection mechanism.

2. The computer program product of claim 1, wherein a critical function is a function that impacts system behavior.

3. The computer program product of claim 1, wherein instructions to activate a return-oriented programming protection mechanisms comprise instructions to block the critical function execution attempt.

4. The computer program product of claim 1, further comprising instructions to report the critical function execution attempt as a potential ROP attack.

5. The computer program product of claim 1, wherein instructions to instrument the one or more critical regions with ROP protection mechanisms comprise instructions to implement a shadow stack with respect to the one or more critical regions.

6. The computer program product of claim 1, wherein instructions to determine whether values associated with the critical function match corresponding expected values comprise instructions to determine whether a return value associated with the critical function matches an expected return value.

7. The computer program product of claim 1, further comprising instructions to receive a set of critical functions and a set of critical regions.

8. A computer system for preventing return-oriented programming (ROP) attacks, the computer system comprising:
   one or more computer processors;
   one or more computer-readable storage media;
   program instructions stored on the computer-readable storage media for execution by at least one of the one or more processors, the program instructions comprising instructions to:
   analyze one or more addresses to identify one or more critical regions, wherein a critical region corresponds to an address that has been selected to be monitored for potential ROP attacks;
   responsive to identifying one or more critical regions, register the one or more critical regions;

identify one or more critical functions, wherein a critical function corresponds to a function for which corresponding execution attempts will be selected to be analyzed as a potential ROP threat;

instrument the one or more critical regions with ROP protection mechanisms;

detect a critical function execution attempt on one or more of the identified critical regions;

determine whether values associated with the critical function match corresponding expected values; and responsive to determining that values associated with the critical function do not match expected values, activate a return-oriented programming protection mechanism.

9. The computer system of claim 8, wherein a critical function is a function that impacts system behavior.

10. The computer system of claim 8, wherein instructions to activate a return-oriented programming protection mechanisms comprise instructions to block the critical function execution attempt.

11. The computer system of claim 8, further comprising instructions to report the critical function execution attempt as a potential ROP attack.

12. The computer system of claim 8, wherein instructions to instrument the one or more critical regions with ROP protection mechanisms comprise instructions to implement a shadow stack with respect to the one or more critical regions.

13. The computer system of claim 8, wherein instructions to determine whether values associated with the critical function match corresponding expected values comprise instructions to determine whether a return value associated with the critical function matches an expected return value.

* * * * *